UNITED STATES PATENT OFFICE.

ROBERT A. FISHER, OF PHILADELPHIA, PENNSYLVANIA.

NEUTRAL SIZING MATERIAL FOR PAPER-MAKERS' USE.

SPECIFICATION forming part of Letters Patent No. 321,092, dated June 30, 1885.

Application filed March 25, 1885. (No specimens.)

*To all whom it may concern:*

Be it known that I, ROBERT A. FISHER, of the city and county of Philadelphia, State of Pennsylvania, have invented a new and Improved Sizing Material for Paper - Makers' Use, which consists, essentially, of sulphate of alumina and sulphate of zinc or sulphate of magnesia, or both of these latter salts, in a porous or vesicular condition, and free from iron, and so "neutral" or "basic" that a moderately dilute solution of the same does not affect the color of ultramarine-blue or other pigments used in coloring paper-pulp.

The following description will enable any one skilled in the art to which my invention most nearly appertains to carry it into practice.

I first prepare a solution of sulphate of alumina from any suitable natural or artificial aluminous material free from iron, according to the ordinary method required for the aluminous material that may be used. The relative proportions of the aluminous material and acid required, and the proper temperature, and the time necessary to produce most economically a highly-concentrated or moderately dilute solution of sulphate of alumina free from iron, is now so well known and understood by those engaged in this department of chemical technology that it is unnecessary to go into details. My invention does not consist in any improvement in the preparation of solutions of sulphate of alumina, but in the subsequent treatment of such solutions obtained by any of the ordinary methods. Should the sulphate-of-alumina solution contain any insoluble matter, it must be removed by subsidence or other means.

The next step is to render the clear solution of sulphate of alumina neutral or slightly basic, so that it will not affect the color of artificial ultramarine-blue. For this purpose I use preferably either oxide of zinc, oxide of magnesium, or the carbonates or bicarbonates of these metals, or mixtures of zinc and magnesium compounds. To the clear solution of sulphate of alumina (of density 26° Baumé, more or less, but the degree of concentration within certain limits is not of much importance) I add the oxide of zinc or other neutralizing material, (either in its dry state or mixed with water,) and stir till all or nearly all of the neutralizing material has been dissolved. The temperature at which the neutralizing material is to be introduced into the solution of sulphate of alumina is immaterial; but I prefer to use a hot or boiling solution. The amount of material required to produce a neutral or slightly basic solution of sulphate of alumina (that is to say, a solution which will not affect the color of ultramarine-blue) will depend upon the amount of free acid present. In some cases two (2) pounds of the neutralizing material to one hundred pounds of the porous substance to be produced might more than suffice. A much larger quantity might be required should the original sulphate-of-alumina solution contain much free acid.

It is not necessary that the solution of sulphate of alumina should be clear—that is to say, free from silica and other insoluble matter—before introducing the neutralizing material. The same may be used at any time after the chemical reaction of the sulphuric acid and aluminous material has ceased, while the solution is still muddled with insoluble matter; but I prefer to add the neutralizing material to a clear solution, highly or but moderately concentrated, as the solution may happen to be.

To determine whether a sufficient quantity of the said neutralizing material has been used, I filter a small portion of the solution treated as above, cool it if hot, then put into a bottle and add a few grains of the best ultramarine-blue used by paper - makers, shake up the contents of the bottle frequently, and if, after the lapse of an hour (more or less) the color of the ultramarine-blue has not been affected, the solution may be considered as neutral, and further addition of neutralizing material is not required. If, on the contrary, the color of the ultramarine-blue has been altered, more of the neutralizing material must be added to the aluminous liquid, and after stirring the same must be again tested with ultramarine-blue. These alternate operations of adding the neutralizing material and testing the resulting liquid with ultramarine-blue must be repeated until the filtered solution fails to affect the color of ultramarine-blue, even after many hours contact.

I do not confine myself to the use of an oxide or other compound of zinc or magnesium. The neutralization of the free acid of the aluminous solution can be accomplished by the use of an alkali or alkaline earth or carbonate or bicarbonate of the same, or of certain metallic salts other than compounds of zinc or magnesium; but I prefer to use a compound of zinc or magnesium, because the use of such compound does not diminish the so-called "sizing-power" of my final product, while the effect of alkalies and all alkaline earths (except magnesia) and certain metallic bases diminishes the said sizing-power.

By the term "sizing-power," as applied relatively to aluminous cake, alum, or any other sizing material used by paper-makers, I understand the relative quantities of such sizing material required to precipitate or "neutralize" a given quantity of the "rosin-size" used in the "sizing-engine." The greater the sizing-power of any sizing material the less of it will be required to do its work.

The next step in my process is to convert the neutral or slightly basic solution into lumps of a porous or vesicular structure. This can be conveniently accomplished as follows, viz: If the solution be clear, concentration can at once proceed; but if not, it must be cleared by subsidence or other means. The clear neutral or slightly basic solution is then to be concentrated in a suitable apparatus to 65° Baumé, more or less; then it is to be cooled, with or without stirring, until it becomes viscid; then I sprinkle upon the viscid mass bicarbonate of soda in fine powder, in the proportion of two (2) pounds (more or less) to one thousand pounds of the white porous substance to be produced, and stir the bicarbonate of soda rapidly into the mass, which, when thoroughly mixed and sufficiently cool, must be discharged into a suitable receptacle to harden. When sufficiently cool, the mass must be broken up into lumps of the desired size.

The porous or vesicular structure may be produced by adding to the hot viscid mass aforesaid a small quantity of bicarbonate or carbonate of soda, potassa, lime, or other alkali or alkaline earth, or other salt of an alkali or alkaline earth, or the bicarbonate or carbonate of some other base, or by any sulphide, sulphite, or other compound which will set free an acid, vapor, or gas, so that the same in the act of escaping will inflate the mass and render it frothy while in the process of cooling and hardening, and whereby it becomes full of pores or vesicules.

A like result, though less perfect in its operation, may be obtained by the rapid injection of air, steam, vapor of water, or other gaseous body into the hot viscid mass, the object being the production of the porous or vesicular condition of the mass when in the act of cooling and hardening.

I am aware that Henry Pemberton, of Allegheny City, Pennsylvania, has patented a process, No. 82,747, for producing pores or vesicules in pure sulphate of alumina.

I am also aware that Carl V. Petraeus has patented a process, No. 269,957, for producing pores or vesicules in a hot viscid acid mass of sulphate of alumina by the use of carbonate of zinc.

I am, moreover, aware that Conrad Semper has patented, No. 280,088, a process "to produce a neutral sulphate of alumina containing magnesia by treating a hot (acid) solution of sulphate of alumina with carbonate or bicarbonate of magnesia."

Letters Patent No. 223,442 have been granted to myself for producing an aluminous cake free from iron, containing zinc, by the use of oxide of zinc to neutralize free acid; but this invention was to produce a cake that was to be "exposed for some days to the action of the air, or in an artificially-heated drying-room, until sufficiently hard to be conveniently reduced by a mill or other machine to a coarse powder."

The invention for which I now desire to secure Letters Patent avoids the expense of drying by long exposure to the air or artificial heat, and permits the conversion of the concentrated neutral or slightly basic solution in less than one hour, and at considerably less cost, into a merchantable article of superior quality because of its porous or vesicular structure.

Having thus described my invention, what I claim as new, and desire to secure by Letters Patent, is—

1. The process described of manufacturing a porous material for paper-makers' use, containing sulphate of alumina and sulphate of zinc free from iron and so neutral that it does not affect the color of artificial ultramarine-blue, substantially as herein set forth.

2. The process herein described of producing from any suitable aluminous substance free from iron a porous sizing material for paper-makers' use, which contains sulphate of alumina and sulphate of zinc, and is free from iron, and so neutral that it does not affect the color of artificial ultramarine-blue, substantially as herein set forth.

3. The process herein described of producing from any suitable aluminous material free from iron a porous sizing material for paper-makers' use, which consists, essentially, in first preparing a solution of sulphate of alumina free from iron, next making such solution neutral or slightly basic by the use of oxide of zinc or other suitable neutralizing material, then, if insoluble matter be present, removing the same to obtain a clear solution, then concentrating the clear solution (if not already sufficiently concentrated) to 65° Baumé, more or less, adding bicarbonate of soda to the hot viscid mass, and finally, after the mass shall have sufficiently cooled, to break it into lumps of the desired size, substantially as herein set forth.

ROBERT A. FISHER.

Witnesses:
MATT. CLIFTON,
WM. G. LITTLETON.